(12) United States Patent
Spieker

(10) Patent No.: US 9,175,701 B2
(45) Date of Patent: *Nov. 3, 2015

(54) SPEED CONTROL STRATEGY

(75) Inventor: Arnold H. Spieker, Commerce Township, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/819,748

(22) PCT Filed: Aug. 26, 2011

(86) PCT No.: PCT/US2011/049327
§ 371 (c)(1),
(2), (4) Date: Feb. 28, 2013

(87) PCT Pub. No.: WO2012/030643
PCT Pub. Date: Mar. 8, 2012

(65) Prior Publication Data
US 2013/0152569 A1    Jun. 20, 2013

Related U.S. Application Data

(60) Provisional application No. 61/379,420, filed on Sep. 2, 2010.

(51) Int. Cl.
*F15B 21/08* (2006.01)
*B60T 8/1755* (2006.01)
*B60T 8/26* (2006.01)
*B60T 8/1766* (2006.01)
*B60T 8/50* (2006.01)

(52) U.S. Cl.
CPC ............. *F15B 21/08* (2013.01); *B60T 8/1755* (2013.01); *B60T 8/1766* (2013.01); *B60T 8/268* (2013.01); *B60T 8/50* (2013.01); *B60T 2201/16* (2013.01); *B60T 2240/06* (2013.01)

(58) Field of Classification Search
CPC ..... B60T 8/1755; B60T 8/268; B60T 8/1766; B60T 8/50; B60T 2201/16; B60T 2240/06; F15B 21/08
USPC ............................ 701/70–72, 78; 60/327, 431
See application file for complete search history.

(56) References Cited

U.S. PATENT DOCUMENTS 4,480,714 A    11/1984  Yabuta et al.
5,390,992 A *   2/1995  Walenty et al. ............... 303/112
(Continued)

FOREIGN PATENT DOCUMENTS

JP    63-116918    5/1988
JP    6-297985    10/1994
KR    10-0413259 B1   12/2003

OTHER PUBLICATIONS

International Search Report, Application No. PCT/US2011/049327 dated Apr. 23, 2012.
(Continued)

*Primary Examiner* — Russell Frejd
(74) *Attorney, Agent, or Firm* — MacMillan, Sobanski & Todd, LLC

(57) ABSTRACT

A method for efficiently decelerating a vehicle having front and rear wheel brakes by isolating the rear wheel brakes and applying pressurized brake fluid only to the front wheel brakes.

16 Claims, 5 Drawing Sheets

(56) References Cited

U.S. PATENT DOCUMENTS

| | | | |
|---|---|---|---|
| 5,449,049 A * | 9/1995 | Every | 180/197 |
| 5,487,594 A * | 1/1996 | Schneider | 303/155 |
| 5,646,849 A * | 7/1997 | Walenty et al. | 701/70 |
| 5,741,050 A * | 4/1998 | Ganzel et al. | 303/10 |
| 5,869,943 A | 2/1999 | Nakashima et al. | |
| 6,065,558 A | 5/2000 | Wielenga | |
| 6,086,168 A | 7/2000 | Rump | |
| 6,263,261 B1 | 7/2001 | Brown et al. | |
| 6,272,420 B1 | 8/2001 | Schramm et al. | |
| 6,278,930 B1 | 8/2001 | Yamada et al. | |
| 6,282,474 B1 | 8/2001 | Chou et al. | |
| 6,311,111 B1 | 10/2001 | Leimbach et al. | |
| 6,315,373 B1 | 11/2001 | Yamada et al. | |
| 6,321,141 B1 | 11/2001 | Leimbach | |
| 6,328,389 B1 | 12/2001 | Yotsuya et al. | |
| 6,356,188 B1 | 3/2002 | Meyers et al. | |
| 6,366,844 B1 | 4/2002 | Woywod et al. | |
| 6,438,464 B1 | 8/2002 | Woywod et al. | |
| 6,554,293 B1 | 4/2003 | Fennel et al. | |
| 6,654,674 B2 | 11/2003 | Lu et al. | |
| 7,925,410 B2 * | 4/2011 | Spieker | 701/72 |
| 2001/0038240 A1 * | 11/2001 | Yoshida et al. | 303/28 |
| 2005/0082911 A1 | 4/2005 | Anwar | |
| 2008/0195290 A1 | 8/2008 | Spieker | |
| 2008/0284242 A1 * | 11/2008 | Ganzel | 303/114.1 |

OTHER PUBLICATIONS

Chinese First Office Action, Application No. 201180042194.6 dated Oct. 31, 2014.

* cited by examiner

SPEED CONTROL STRATEGY

BACKGROUND OF THE INVENTION

This invention relates in general to vehicle speed control and in particular to vehicle control systems for reducing the speed of a vehicle to improve vehicle dynamic conditions through the application of a vehicle brake actuation.

In a variety of vehicle control systems it is advantageous to reduce the speed of the vehicle to improve the vehicle dynamic condition. This is primarily accomplished through the application of the vehicle brakes by hydraulic actuators which include pumps and solenoid valves. The fluid flow rate of the braking system is limited by the motor design, voltage, pump capacity, internal resistances and other braking system parameters. The fluid flow rate of pressurized brake fluid to the vehicle brake actuators provides one limit to the rate at which the speed of the vehicle is reduced. During conventional braking, pressurized brake fluid is supplied to all four brake actuators of the vehicle for a respective braking system having similar braking circuits and components and is equally distributed. Most pressure-volume relationships for brake calipers require more fluid at lower pressures during initial application of applying a braking force on each of the brake actuators followed by a linear increase of fluid volume up to maximum pressure. This initial volume requirement is mostly due to knockback of the actuator pistons and seal compliance. This can be represented as a braking force to volume relationship. As a result, a large fluid volume is initially required at a high flow rate of the brake fluid within a brake circuit. To avoid low braking forces during initial braking conditions, an increased pump flow rate must be obtained in each of the hydraulic brake circuits to increase the flow of brake fluid to each brake actuator. This results in high system cost. Therefore, it would be desirable to provide a lower cost alternative for increasing vehicle braking response.

SUMMARY OF THE INVENTION

This invention relates to vehicle control systems for reducing the speed of a vehicle to improve vehicle dynamic conditions through the application of a vehicle brake actuation.

The present invention contemplates a method for efficiently decelerating a vehicle having a braking circuit for braking a set of brake actuators that includes providing an electronic vehicle braking system having at least one brake circuit for supplying pressurized brake fluid to front and rear vehicle brake actuators. The brake actuators associated with rear vehicle brakes are isolated upon detection of a need for rapid vehicle speed reduction and a flow of pressurized brake fluid is then generated and supplied to the brake actuators associated with the front vehicle brakes.

The invention also contemplates a system for carrying out the method described above.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Under certain conditions such as ABS, roll mitigation, or other vehicle stability dynamic controls it is critical to achieve an instantaneous high level of deceleration for a vehicle. However, as described above, pressurized brake fluid is supplied to all four brake actuators of the vehicle for a respective braking system having similar braking circuits and components and is equally distributed during conventional brake circuit operation. The inventor has determined that, as a result of conventional brake circuit operation, the pumping of fluid to build pressure within each of the vehicle brake actuators during the initial braking stages will take longer than a brake circuit of a same volume but having fewer brake actuators. The total vehicle brake force rate would be higher if one brake, corresponding to the highest specific output, on each circuit would be applied, while the other wheel on the circuit is isolated.

Figure 1:
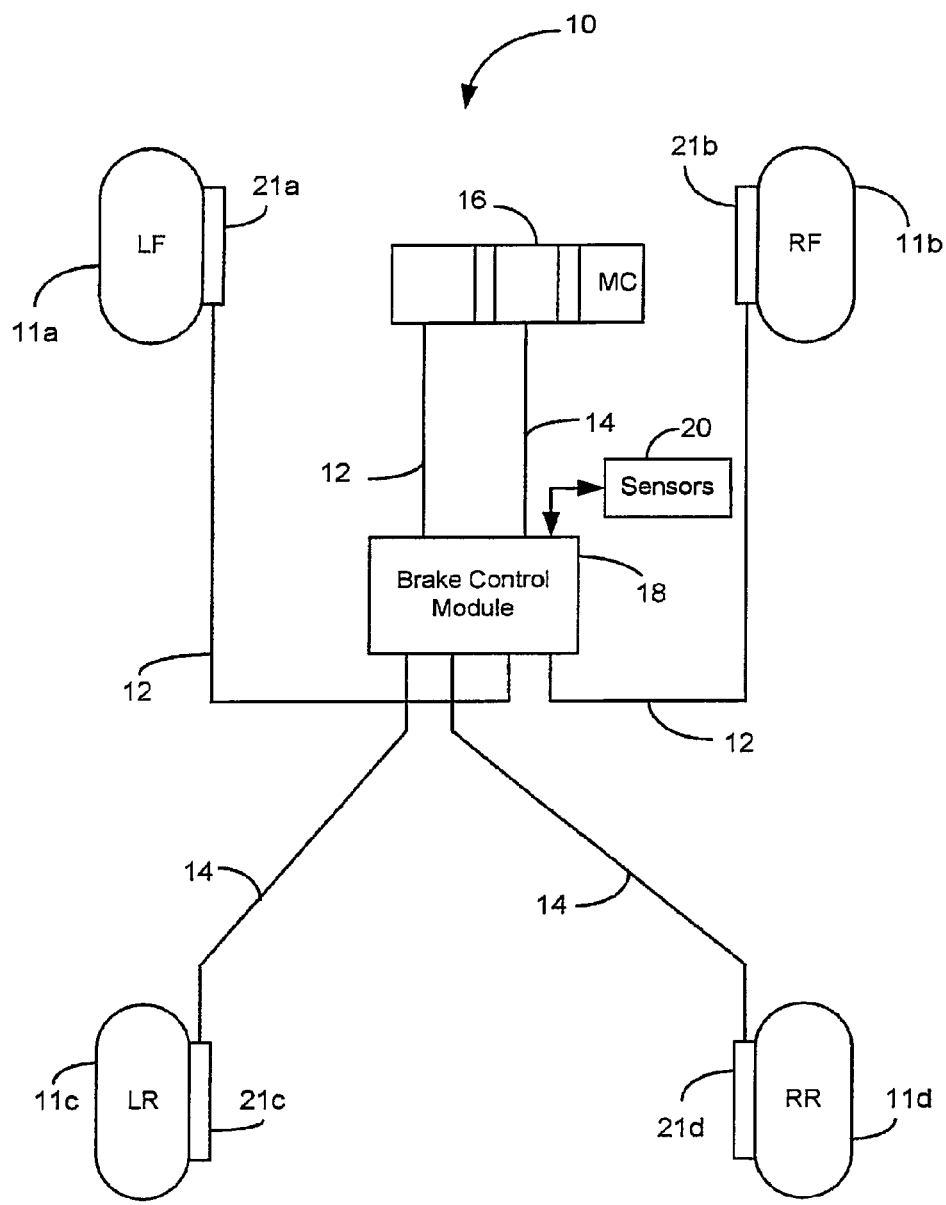
FIG. 1 is a schematic diagram of a hydraulic braking system according to the preferred embodiment of the present invention.

Referring now to the drawings and particularly to FIG. 1, there is shown a schematic diagram of a hydraulic braking system for providing hydraulic brake fluid to a plurality of vehicle brake actuators. The hydraulic braking system is shown generally at 10. The hydraulic braking system 10 includes vehicle wheels 11a, 11b, 11c, and 11d. Vehicle brake actuators 21a, 21b, 21c, and 21d each include a respective brake actuation member, such as a slave cylinder, and friction member actuable by the actuation member for engaging a rotatable braking surface of the vehicle wheels 11a, 11b, 11c, and 11d, respectively. In the preferred embodiment, the vehicle braking system utilizes a vertically split braking system. A first circuit of pressurized hydraulic brake fluid 12 is provided for actuating vehicle brake actuators 21a and 21b. A second circuit of pressurized hydraulic brake fluid 14 is provided for actuating vehicle brake actuators 21c and 21d. Alternatively, the vehicle braking system may utilize a diagonally split braking system (not shown).

The source of pressurized brake fluid for the first circuit 12 and second circuit 14 is provided by a brake fluid pressurization system, such as a manually operated master cylinder 16. The master cylinder 16 is operated by a brake pedal to supply pressurized brake fluid to the first circuit 12 and the second circuit 14. Typically, the master cylinder 16 includes a tandem master cylinder having two service pistons, but the master cylinder 16 may be of any suitable design. The brake fluid pressurization system may further include a hydraulic braking boost system, where a motor driven pump is used to generate pressurized brake fluid flow to the vehicle brake actuators. The hydraulic braking boost system may be activated upon a sensed input command by the driver operating the brake pedal or by a vehicle stability control system that monitors vehicle conditions such as, but not limited to, acceleration forces exerted on each wheel, driver's steering wheel input, yaw moment, or suspension changes.

A vehicle brake module 18 may include a vehicle stability control module in addition to the hydraulic braking boost system. The vehicle stability control (VSC) module may comprise ABS functionality, TC functionality, or YSC functionality. Additionally, the VSC may include a roll mitigation functionality for dynamically performing stability control functions for preventing a roll over. The vehicle brake module 18 receives pressurized hydraulic brake fluid from the first circuit 12 and the second circuit 14. The vehicle brake module 18 outputs pressurized hydraulic brake fluid to the respective vehicle brake actuators via the first circuit 12 and the second circuit 14. Various hydraulically controlled valves within the vehicle brake module 18 control the hydraulic pressure to the four vehicle brake actuators 21a, 21b, 21c, and 21d independently for performing various deceleration or stability control operations. As a result, each vehicle wheel may be braked individually or in combination as well as being selectably isolated from any applied braking force.

FIG. 1 also shows at least one sensor 20 (e.g., accelerometer) disposed on the vehicle 10 for detecting vehicle operating conditions. For example, acceleration data retrieved from sensor 20 is provided to a controller (not shown) and when used in cooperation with a vehicle dynamic model stored in the memory of the controller or other memory device, the normal force parameters exerted on each wheel of the vehicle are determined. Determining normal force parameters include retrieving sensed inputs (or measured inputs) and processing such information to determine instantaneous normal forces exerted on each wheel. Determining normal force parameters may also include predicting normal forces derived from the sensed inputs. Furthermore, the exact values of the normal forces are not required, rather the relative magnitude of the normal forces with respect to each wheel may be the determining factor, i.e., higher or lower relative to one another. Based on the determined, i.e., instantaneous or predicted, normal forces, the various braking strategies as discussed infra may be applied. Other types of sensors may be used to monitor the vehicle operating conditions to determine or predict vehicle stability. Examples of data that may be monitored by various sensors include wheel speed, yaw rate, suspension changes, steering wheel changes, acceleration, roll angle data.

Figure 2:
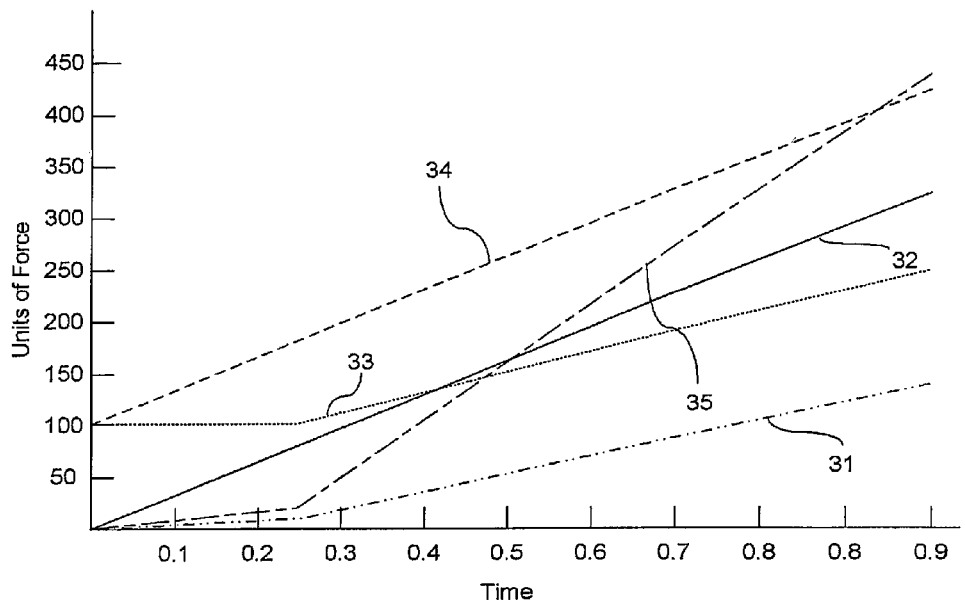
FIG. 2 is a graph illustrating the applied braking force to a pair of wheels of a brake circuit.

FIG. 2 is a graph illustrating a pressure and volume build when applying a braking force to both wheels on a respective braking circuit. A plurality of data measurements are shown for a given braking force exerted on two wheels of a same braking circuit. The horizontal axis (x-axis) is a measurement in units of time (e.g., seconds). The vertical axis (y-axis) is a measurement in units of force, e.g., Newton (N). Data lines 31, 32, 33, and 34 represent pressures and volumes of braking fluid exerted on the two wheels within a respective braking circuit. Data lines 32 and 34 represent a controlled fluid volume flow rate into the braking circuit 12 when applying pressurized brake fluid on vehicle brake actuators 21a and 21b, respectively. The applied braking force may be applied as a result of the driver's input braking demand on the brake pedal or as vehicle stability control operation as demanded by the vehicle stability control system without the input of the brake pedal demand. Data lines 31 and 33 represent a pressure increase in braking circuit 12 when applying pressurized brake fluid on the vehicle brake actuators 21a and 21b, respectively. Data lines 33 and 34 are offset by 100 units of force so that both sets of data lines from each respective wheel may be illustrated on a single graph for comparison purposes. As shown from the graph, when a braking force is applied to each wheel of a respective braking circuit, pressure increases in both wheels at substantially the same rate over a period of time. Similarly, the fluid flow rate volume of brake fluid increases in both wheels at substantially the same rate over the same period of time. Data line 35 represents an effective brake circuit braking force built over time as a result of the brake force applied by vehicle brake actuators 21a and 21b.

Figure 3:
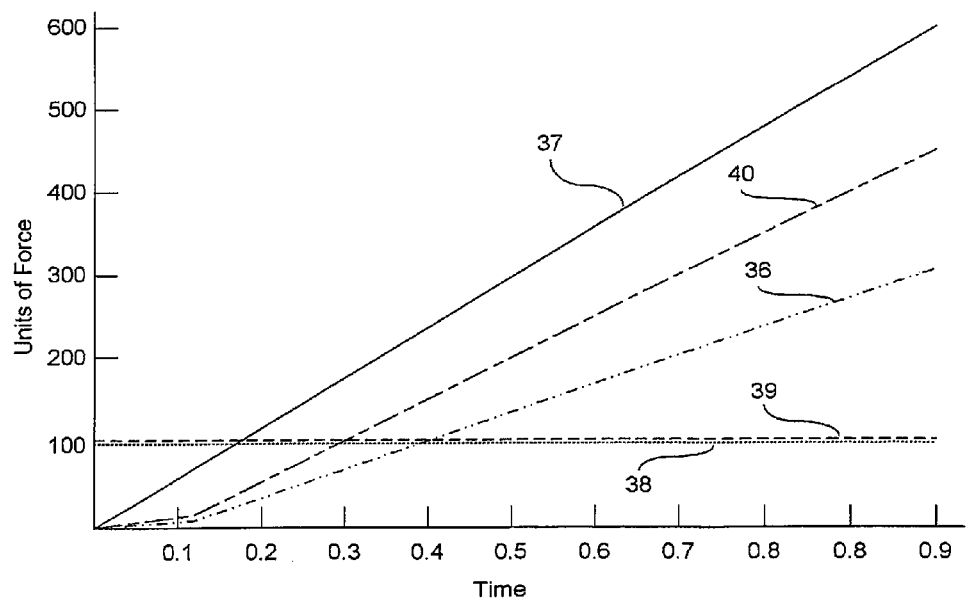
FIG. 3 is a graph illustrating the applied braking force to a single wheel of a brake circuit.

FIG. 3 is a graph illustrating pressure and volume build when applying a braking force only to a single wheel on a respective braking circuit. A plurality of data measurements are shown for a given braking force exerted only on a single brake actuator of a respective wheel of a respective braking circuit while the other brake actuator on the same respective circuit is isolated from the braking fluid of the respective circuit. Data lines 37 and 39 represent a controlled fluid volume flow rate within braking circuit 12 and to vehicle brake actuator 21a and 21b, respectively, when pressurized brake fluid is applied only on 21a. Data lines 36 and 38 represent the pressure increase within braking circuit 12 and to vehicle brake actuator 21a and 21b, respectively when braking fluid is isolated from vehicle brake actuator 21b and is applied only to vehicle brake actuator 21a. Data lines 38 and 39 are offset by 100 units of force for comparison purposes with data lines 36 and 37, respectively. Since the vehicle brake actuator 21b is isolated from having a braking force applied to it, the pressure and volume increase of the front right wheel is zero. Data line 40 represents the effective brake circuit braking force built over time as a result of the brake force applied by vehicle brake actuators 21a and 21b where braking force is applied only to vehicle brake actuator 21a during an initial stage of braking.

In comparing the pressure and volume builds of the graphs as illustrated in FIG. 2 and FIG. 3, it is shown that under a single wheel braking condition the pressure and volume of brake fluid applied to the single braking wheel increases more rapidly in the initial stages of braking when the braking force is first applied as opposed to the braking force when applied to both wheels of the same braking circuit over the same period of time. This is the result of having more braking fluid volume available to enter the front left brake actuator 21a since the front right brake actuator 21b is isolated. As discussed earlier, braking during the initial stages is based on a pressure to volume relationship. When applying braking fluid to only the single wheel of the braking circuit, the volume of braking fluid within the first circuit is not equally divided between the front left brake actuator 21a and the right front brake actuator 21b. Since the right front brake actuator 21b is isolated from receiving additional braking fluid, more brake fluid volume is available to be exerted on the left front brake actuator 21a in a shorter period of time under a same braking force. As a result, higher braking forces are exerted on the left front brake actuator 21a under the single braking condition in the initial stages of braking. It is shown by data line 40, in FIG. 2, that for a given level of force for a single wheel brake actuation, the braking force exerted on the vehicle at a respective time of 0.3 is 100 units of force. For the two wheel braking actuation, as shown in FIG. 1, the braking force exerted on the vehicle at a respective time of 0.3 is 35 units of force, as illustrated by data line 35. Therefore, to optimize the deceleration rate of a vehicle having two wheels on each brake circuit, it would be most effective to initially apply braking fluid to two wheels on opposite hydraulic circuits, rather than all four vehicle brakes simultaneously. Applying the pressurized brake fluid to only two of the vehicle brakes on opposite hydraulic brake circuits will create a greater braking force for a given fluid transfer.

For a given vehicle condition where one of the vehicle wheels is or will be in a condition of low normal force such that the inside wheels of a vehicle are at a high mu, the wheel having the low normal force will provide less braking force. If braking is applied to both wheels of the respective circuit under this condition, then the time required to build this low pressure can be significant. Since the wheel with the low normal force contributes little to the reduction of vehicle speed when braking is first applied, isolating this wheel from receiving additional brake fluid generates a pressure and volume increase in the non-isolated wheel having a high normal force. This results in an increase in the total vehicle brake force rate for decelerating the vehicle during this initial stage of braking. After the initial stage of braking, the isolated wheel having the lower normal force is un-isolated, thereby allowing all vehicle brakes to apply a braking force to the vehicle during a second stage where the braking force applied to both wheels is more effective than braking a single wheel of a brake circuit.

If rapid speed reduction is immediately required by respective braking systems such as stability control, or roll mitigation where a pair of wheels will be at low normal force, increased braking force for obtaining speed reduction may be obtained faster if braking pressure is applied only to the wheel of a respective circuit having a high normal load while the other wheel of the respective circuit under the low normal load is isolated.

Figure 4:
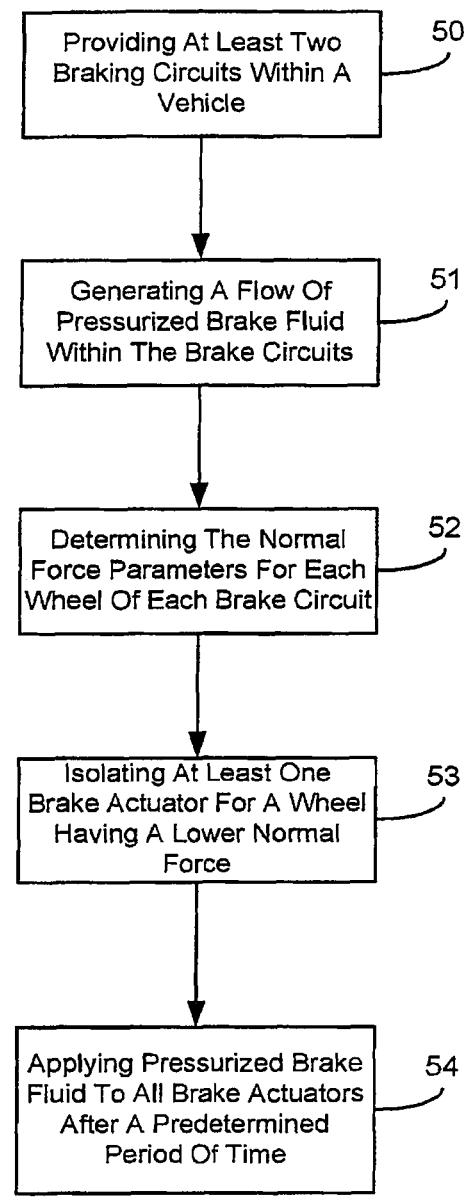
FIG. 4 is a method for increasing the total vehicle braking rate of a vehicle during initial braking.

FIG. 4 illustrates a method for increasing the total braking rate of a vehicle. In step 50, a vehicle is provided with at least two braking circuits. The braking system has similar braking circuits and components. In step 51, a flow of pressurized brake fluid is generated within each of the braking circuits. Each braking circuit will have valves to apply brake fluid flow to each individual brake actuator. In step 52, the normal force parameters exerted on each wheel of the vehicle are determined relative to one another. The determined normal forces may be normal forces that are being instantaneously applied or may be anticipated (i.e., predicted) normal forces given one or more sensed inputs. Such forces may be determined from various sensors disposed about the vehicle for sensing vehicle operating conditions and parameters. In step 53, at least one wheel having a lower normal force is isolated from receiving braking fluid for a predetermined period of time, i.e., initial stage. This allows additional volume to enter the un-isolated wheel for increased braking force. Additionally, each wheel having a lower normal force of a respective brake circuit may be isolated so that additional brake fluid volume within each circuit may be applied to the un-isolated brake wheel having the higher normal force. In step 54, after a predetermined period of time, brake fluid is applied to all brake actuators. After this predetermined period of time, i.e., at the beginning of a second stage, vehicle braking is optimized when a braking force is applied to all wheels of the vehicle.

The invention also contemplates an alternate embodiment for applications requiring a rapid increase in vehicle braking force from a no braking condition, without driver brake pedal input, for speed reduction in systems such as collision avoidance, active cruise control, and pre-collision braking where the system will command a rapid reduction in vehicle speed. As a result, the total vehicle braking force will be applied faster if only a single wheel on a circuit is activated. Commonly, vehicle braking systems will have a difference in the specific output of the front and rear brakes. This is a function of the brake caliper piston size and coefficient of friction of the brake linings and for most vehicles the fronts specific output is higher than that of the rear. This would then make more of a difference if the higher specific output brake were applied. Accordingly, the alternate embodiment contemplates isolating the rear brakes and applying braking force only to the front brakes. The alternate embodiment may also optionally include removing the isolation of the rear brakes to allow application of all the brakes when a selected criteria is met. The criteria may include vehicle speed falling below a threshold, passage of a predetermined period of time, and/or other factors.

Figure 5:
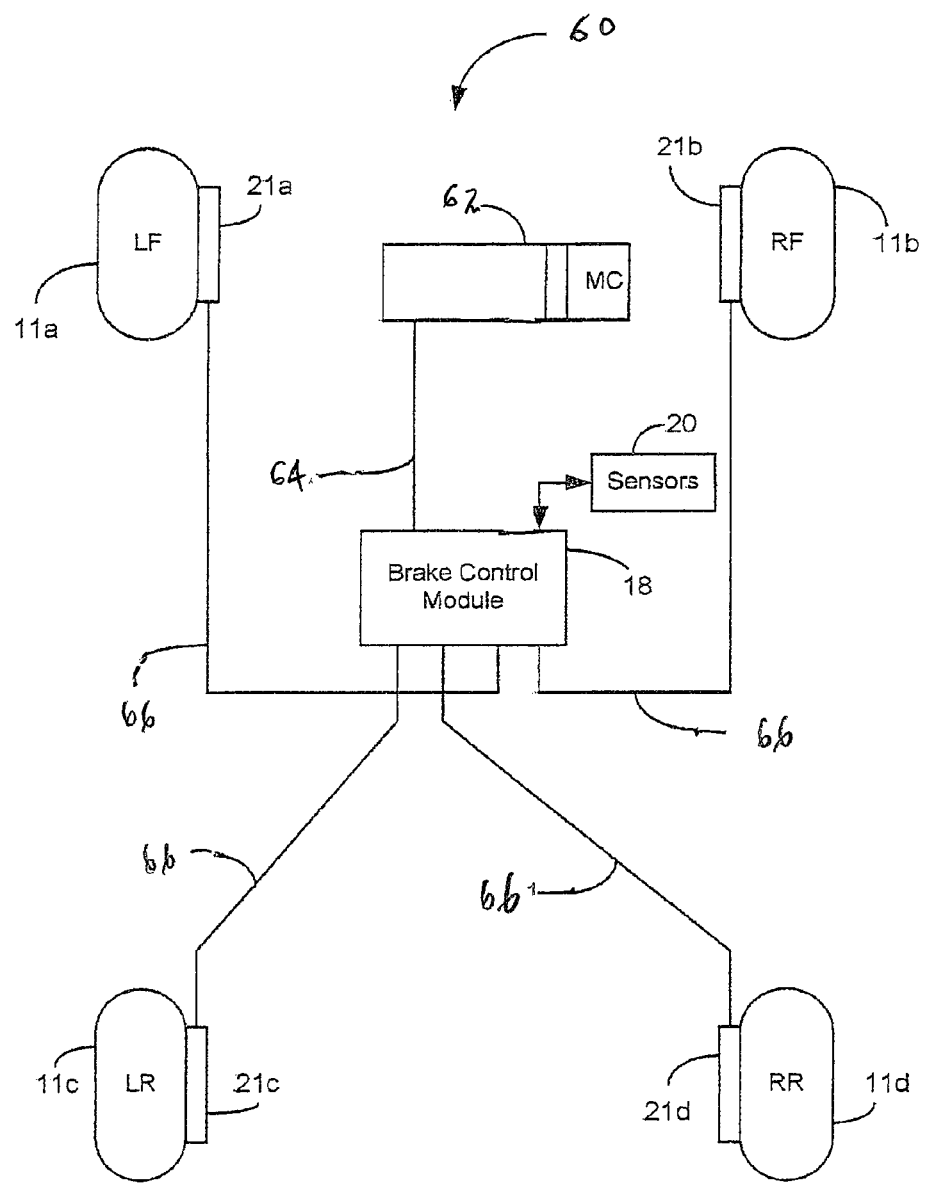
FIG. 5 is a schematic diagram of an alternate embodiment of hydraulic braking system shown in FIG. 1.

The alternate embodiment may be implemented upon a vertically split braking system, such as brake system 10 shown in FIG. 1, or upon a diagonally split braking system (not shown). Additionally, the alternate embodiment also may be applied to a brake system having a single brake circuit, such as the system 60 illustrated in FIG. 5. Components in FIG. 5 that are similar to components shown in FIG. 1 have the same numerical identifiers. The brake system 60 includes brake master cylinder 62 having one chamber and a single piston. The master cylinder 62 is connected by a single brake fluid line 64 to an electronic brake control module 18. The electronic brake control module 18 is connected to the vehicle brake actuators 21a, 21b, 21c and 21d by a plurality of brake fluid supply lines 66. As described above, the electronic brake control module 18, which includes solenoid valves and a brake fluid pump, is responsive to signals received from the sensors 20 to selectively supply pressurized brake fluid to the vehicle brake actuators 21a, 21b, 21c and 21d. The electronic brake control module 18 also is also responsive to signals received from the sensors 20 to selectively release pressurized brake fluid from the vehicle brake actuators 21a, 21b, 21c and 21d.

Figure 6:
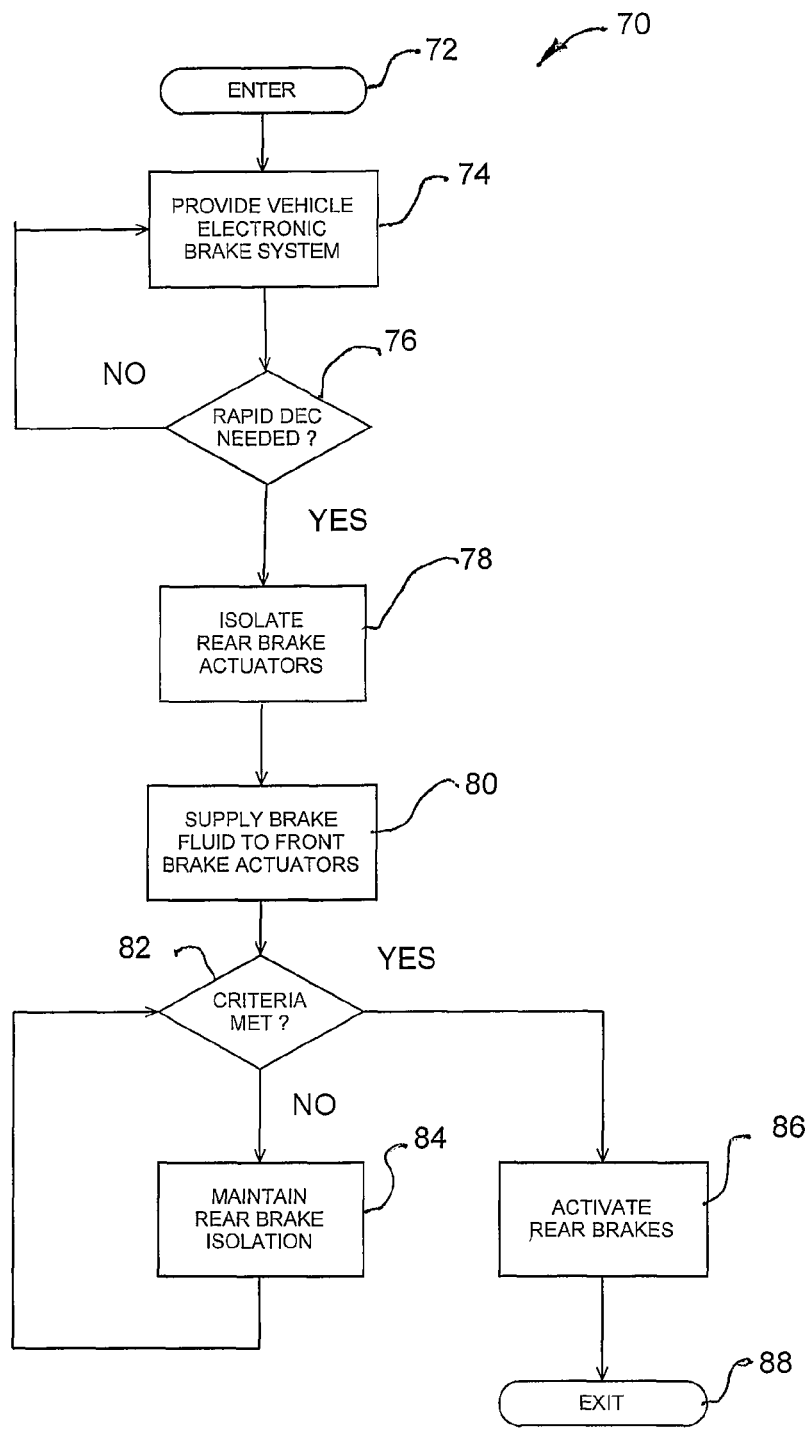
FIG. 6 is a method for implementing an alternate embodiment of the invention.

FIG. 6 illustrates a method 70 in the form of a flow chart for an algorithm for implementing the alternate embodiment of the invention. The algorithm is entered through block 72 and proceeds to functional block 74 where an electronically controlled vehicle brake system is provided. The algorithm then advances to decision block 76 where a determination is made from inputs, from sensors, or other devices, whether or not a rapid deceleration of the vehicle is needed. If a rapid deceleration of the vehicle is not needed, the algorithm returns to functional block 74. If a rapid deceleration of the vehicle is needed, the algorithm transfers to functional block 78.

In functional block 78, the rear brake actuators are isolated. The algorithm then advances to functional block 80 where pressurized brake fluid is provided to the front brake actuators to cause a rapid deceleration of the vehicle. The algorithm continues to decision block 82 where one or more criteria, such as, for example, the speed of the vehicle, are checked to determine whether or not the rapid deceleration is still needed. If rapid deceleration is still needed, the algorithm transfers to functional block 84 where the isolation of the rear brake actuators is maintained. If rapid deceleration is no longer needed, the algorithm transfers to functional block 86 where the isolation of the rear brake actuators is ended and normal operation of the vehicle brake system is returned. The algorithm then exits through block 88. It will be appreciated that the algorithm shown in FIG. 6 is meant to be exemplary and that the alternate embodiment also may be practiced with an algorithm other that that illustrated by the flow chart in FIG. 6.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for decelerating a vehicle comprising the steps of:
   (a) providing a hydraulic braking system having at least one brake circuit for supplying pressurized brake fluid to vehicle brake actuators that are each associated with a wheel brake;

(b) sensing braking forces being applied to each of the wheels by the vehicle brake actuators during a brake activation;

(c) comparing the sensed braking forces;

(d) isolating the vehicle brake actuator associated with a lowest braking force upon detection of a need for rapid vehicle speed reduction; and (e) generating a flow of pressurized brake fluid to the non-isolated vehicle brake actuator.

2. The method according to claim 1 wherein step (d) includes isolating a plurality of vehicle brake actuators associated with lower braking forces.

3. The method according to claim 2 further including, subsequent to step (d), removing the isolation of the isolated vehicle brake actuators upon determining that a specific criteria associated with stopping the vehicle has been met, and then applying pressured brake fluid to the vehicle brake actuators associated with rear vehicle brakes.

4. The method of claim 1 wherein a first braking force being applied to a first wheel and a second braking force being applied to a second wheel are sensed and the first sensed braking force is compared to the second sensed braking force.

5. A method for decelerating a vehicle comprising the steps of:

(a) providing a hydraulic braking system having at least one brake circuit for supplying pressurized brake fluid to front and rear vehicle brake actuators associated with respective front and rear brakes, wherein an output of the front brakes is higher than an output of the rear brakes;

(b) isolating the rear vehicle brake actuator upon detection of a need for rapid vehicle speed reduction; and (c) generating a flow of pressurized brake fluid to the front vehicle brake actuator.

6. The method according to claim 5 further including, subsequent to step (c), removing the isolation of the rear vehicle brake actuator upon determining that a specific criteria associated with stopping the vehicle has been met, and then applying pressured brake fluid to the rear vehicle brake actuator.

7. The method according to claim 6 wherein the hydraulic brake system includes two brake circuits that are vertically split, with a first brake circuit controlling front vehicle brakes and a second brake circuit controlling rear vehicle brakes, and further wherein the rear vehicle brake actuators in the second brake circuit are isolated in step (b).

8. The method according to claim 6 wherein the hydraulic brake system includes two brake circuits that are diagonally split, with a first brake circuit controlling one front vehicle brake and one diagonally opposite rear vehicle brake and a second brake circuit controlling remaining vehicle brakes, and further rear brake actuators in both brake circuits are isolated in step (b).

9. The method according to claim 6 wherein the specific criteria for removing the isolation of the rear vehicle brake actuator is a vehicle speed falling below a threshold.

10. The method according to claim 6 wherein the specific criteria for removing the isolation of the rear vehicle brake actuator is a duration of the brake actuation exceeding a predetermined time period.

11. A vehicle stability control system for decelerating a vehicle, the vehicle stability control system comprising:

a braking circuit for braking a set of brake actuators associated with respective front and rear brakes coupled to a set of wheels that include respective front and rear vehicle wheels, wherein an output of the front brakes is higher than an output of the rear brakes;

a brake fluid pressurization system coupled to said braking circuit;

a brake control module for controlling hydraulic pressure to each brake actuator;

at least one sensor for generating a signal indicative of a need for rapid vehicle speed reduction; and a controller for the brake fluid pressurization system, the controller connected to the at least one sensor and operative, upon receiving a signal indicative of a need for rapid vehicle speed reduction, to first isolate the brake actuators associated with the rear vehicle wheels and then to apply pressurized brake fluid to the brake actuators associated with the front vehicle wheels.

12. The system according to claim 11 wherein the controller is further operable to remove the isolation of the brake actuators associated with rear vehicle brakes upon determining that a specific criteria associated with stopping the vehicle has been met, and further wherein the controller is then operable to apply pressured brake fluid to the brake actuators associated with rear vehicle brakes.

13. The system according to claim 12 wherein the electronic brake system includes two brake circuits that are vertically split, with a first brake circuit controlling the front vehicle brakes and a second brake circuit controlling the rear vehicle brakes, and further wherein the brake actuators in the second brake circuit are isolated in step (b).

14. The system according to claim 12 wherein the electronic brake system includes two brake circuits that are diagonally split, with a first brake circuit controlling one front vehicle brake and one diagonally opposite rear vehicle brake and a second brake circuit controlling the remaining vehicle brakes, and further the rear brake actuators in both brake circuits are isolated in step (b).

15. The system according to claim 12 wherein the specific criteria for removing the isolation of the brake actuators is a vehicle speed falling below a threshold.

16. The system according to claim 12 wherein the specific criteria for removing the isolation of the brake actuators is a duration of the brake actuation exceeding a predetermined time period.

\* \* \* \* \*